United States Patent
Bae et al.

(10) Patent No.: US 8,902,283 B2
(45) Date of Patent: Dec. 2, 2014

(54) METHOD AND APPARATUS FOR CONVERTING A TWO-DIMENSIONAL IMAGE INTO A THREE-DIMENSIONAL STEREOSCOPIC IMAGE

(75) Inventors: Soo Hyun Bae, San Jose, CA (US); Farhan Baqai, Fremont, CA (US); Alexander Berestov, San Jose, CA (US)

(73) Assignee: Sony Corporation, Tokyo (JP)

( * ) Notice: Subject to any disclaimer, the term of this patent is extended or adjusted under 35 U.S.C. 154(b) by 350 days.

(21) Appl. No.: 12/900,053

(22) Filed: Oct. 7, 2010

(65) Prior Publication Data

US 2012/0086775 A1 Apr. 12, 2012

(51) Int. Cl.
*H04N 13/00* (2006.01)
*H04N 13/02* (2006.01)
*G06T 15/40* (2011.01)

(52) U.S. Cl.
CPC .............. *H04N 13/026* (2013.01); *G06T 15/40* (2013.01); *H04N 13/0018* (2013.01); *H04N 2013/0081* (2013.01)
USPC .......................................................... 348/42

(58) Field of Classification Search
CPC ......... G06T 5/00; G06T 5/005; G06T 11/001; G06T 15/205; G06T 1/00; G06T 2207/10016; G06T 7/0048; H04N 13/026; H04N 2013/0081; H04N 13/00; H04N 13/0271; H04N 1/4092
See application file for complete search history.

(56) References Cited

U.S. PATENT DOCUMENTS

| | | | |
|---|---|---|---|
| 7,218,795 B2 * | 5/2007 | Trifonov et al. | 382/279 |
| 7,573,475 B2 | 8/2009 | Sullivan et al. | |
| 7,907,793 B1 * | 3/2011 | Sandrew | 382/284 |
| 2007/0024614 A1 * | 2/2007 | Tam et al. | 345/419 |
| 2007/0279412 A1 * | 12/2007 | Davidson et al. | 345/419 |
| 2010/0041722 A1 * | 2/2010 | Hu et al. | 514/364 |
| 2010/0239180 A1 * | 9/2010 | Yea et al. | 382/261 |
| 2011/0123113 A1 * | 5/2011 | Berretty et al. | 382/173 |
| 2011/0255601 A1 * | 10/2011 | Pateux et al. | 375/240.16 |
| 2012/0162193 A1 * | 6/2012 | Bae et al. | 345/419 |

FOREIGN PATENT DOCUMENTS

JP 2009-291276 12/2009
WO WO 2010043809 A1 * 4/2010

OTHER PUBLICATIONS

Liang Wang; Hailin Jin; Ruigang Yang; Minglun Gong; "Stereoscopic inpainting: Joint color and depth completion from stereo images," IEEE Conference on Computer Vision and Pattern Recognition, 2008. CVPR 2008. pp. 1-8, Jun. 23-28, 2008.*

(Continued)

*Primary Examiner* — Dave Czekaj
*Assistant Examiner* — Tyler W Sullivan
(74) *Attorney, Agent, or Firm* — Moser Taboada

(57) ABSTRACT

The present invention is directed to a method and apparatus for converting a two-dimensional image into a stereoscopic three-dimensional image. In one embodiment, a method of converting a two-dimensional image into a stereoscopic three-dimensional image comprises identifying at least one corresponding pixel from a left eye image and determining a depth and an intensity value for the each pixel within a right eye image using the at least one corresponding pixel. The depth value is stored in a right eye depth map and the intensity value is stored in the right eye image. The method further comprises inpainting at least one occluded region within the right eye image using the right eye depth map.

20 Claims, 9 Drawing Sheets

(56) References Cited

OTHER PUBLICATIONS

Lee, Cheon, and Yo-Sung Ho. "View synthesis using depth map for 3D video." Proceedings: APSIPA ASC 2009; Asia-Pacific Signal and Information Processing Association, 2009 Annual Summit and Conference. Asia-Pacific Signal and Information Processing Association, 2009 Annual Summit and Conference, International Organizing Committee, 2009.*

Serdar, Ince, and Konrad Janusz. "Occlusion-aware view interpolation." EURASIP Journal on Image and Video Processing 2008 (2009).*

Daribo, I.; Pesquet-Popescu, B., "Depth-aided image inpainting for novel view synthesis," 2010 IEEE International Workshop on Multimedia Signal Processing (MMSP), pp. 167-170, Oct. 4-6, 2010.*

"Object Removal by Exemplar-Based Inpainting" A. Criminisi, P. Pérez and K. Toyama, 8 pages, no date.

* cited by examiner

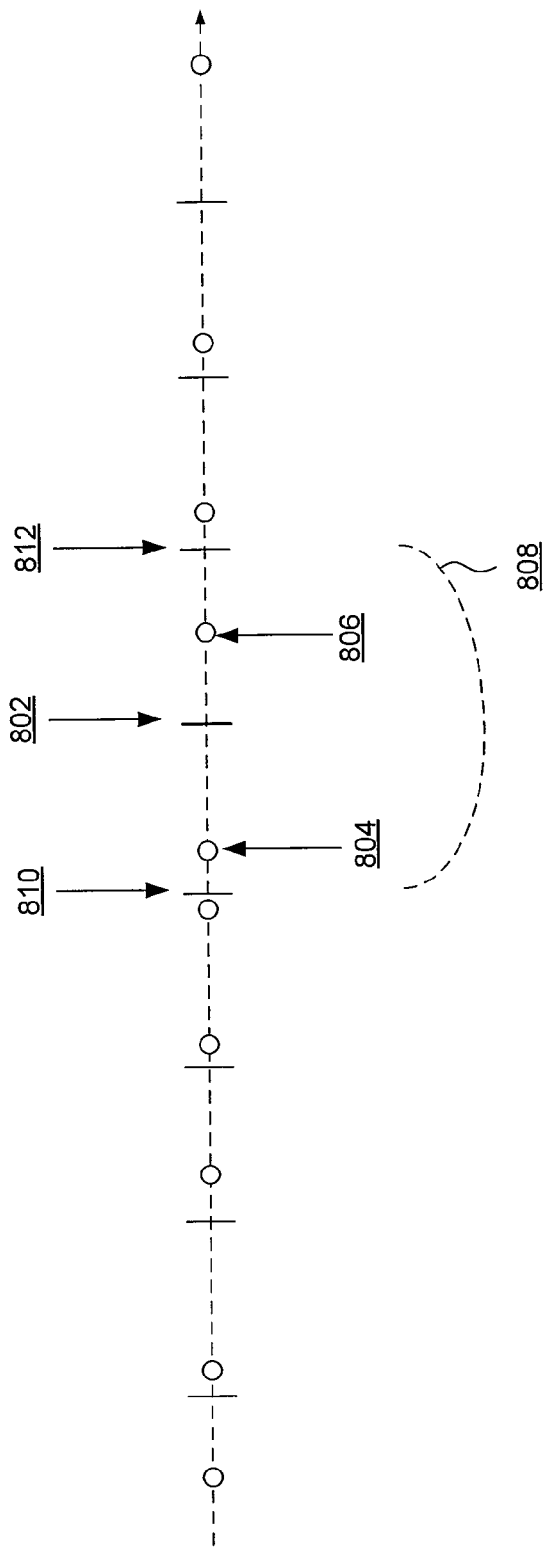

METHOD AND APPARATUS FOR CONVERTING A TWO-DIMENSIONAL IMAGE INTO A THREE-DIMENSIONAL STEREOSCOPIC IMAGE

BACKGROUND

1. Technical Field

Embodiments of the present disclosure generally relate to an image processing system and, more particularly, to a method and apparatus for converting a two-dimensional image into a stereoscopic three-dimensional image.

2. Description of the Related Art

Image capturing and/or video recording devices proliferate throughout the general population and dominate a significant portion of the current global consumer electronics market. The widespread usage of such devices brings to light various defects. For example, these devices store images and/or video frames as merely two dimensional representations of a scene. Even if a depth map is provided, a three-dimensional representation cannot be rendered and viewed without utilizing significant processing power and memory capacity. In order to conserve resources, current technologies, therefore, limit these devices to capturing images depicting one of only a few possible views of the scene.

Furthermore, processing and storing the images causes artifacts. Artifacts, generally, include noticeable distortions of media (e.g., an image, audio and/or video) due to the application of an overly aggressive or inappropriate lossy data compression algorithm. For example, certain block-based inpainting or three-dimension projection techniques cause these noticeable distortions. When such an image is received, a block-by-block decoding of the image is performed to reconstruct the transferred image. The quantization of the individual image blocks is necessarily associated with a loss of information that can result in visible edges at the block boundaries during the reconstruction. These artifacts can be especially prominent when a very rough quantization is provided corresponding to large quantization parameters.

Therefore, there is a need in the art for a method and apparatus for converting a two-dimensional image into a stereoscopic three-dimensional image that produces fewer artifacts.

SUMMARY

Various embodiments of the present disclosure generally include a method and apparatus for converting a two-dimensional image into a stereoscopic three-dimensional image. In one embodiment, a computer implemented method of converting a two-dimensional image into a stereoscopic three-dimensional image including for each pixel within a right eye image, identifying at least one corresponding pixel from a left eye image and determining a depth and an intensity value for the each pixel within the right eye image using the at least one corresponding pixel, wherein the depth value is stored in a right eye depth map and the intensity value is stored in the right eye image and inpainting at least one occluded region within the right eye image using the right eye depth map.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 illustrates depth and intensity interpolation on a right eye image in accordance with at least one embodiment.

DETAILED DESCRIPTION

Figure 1:
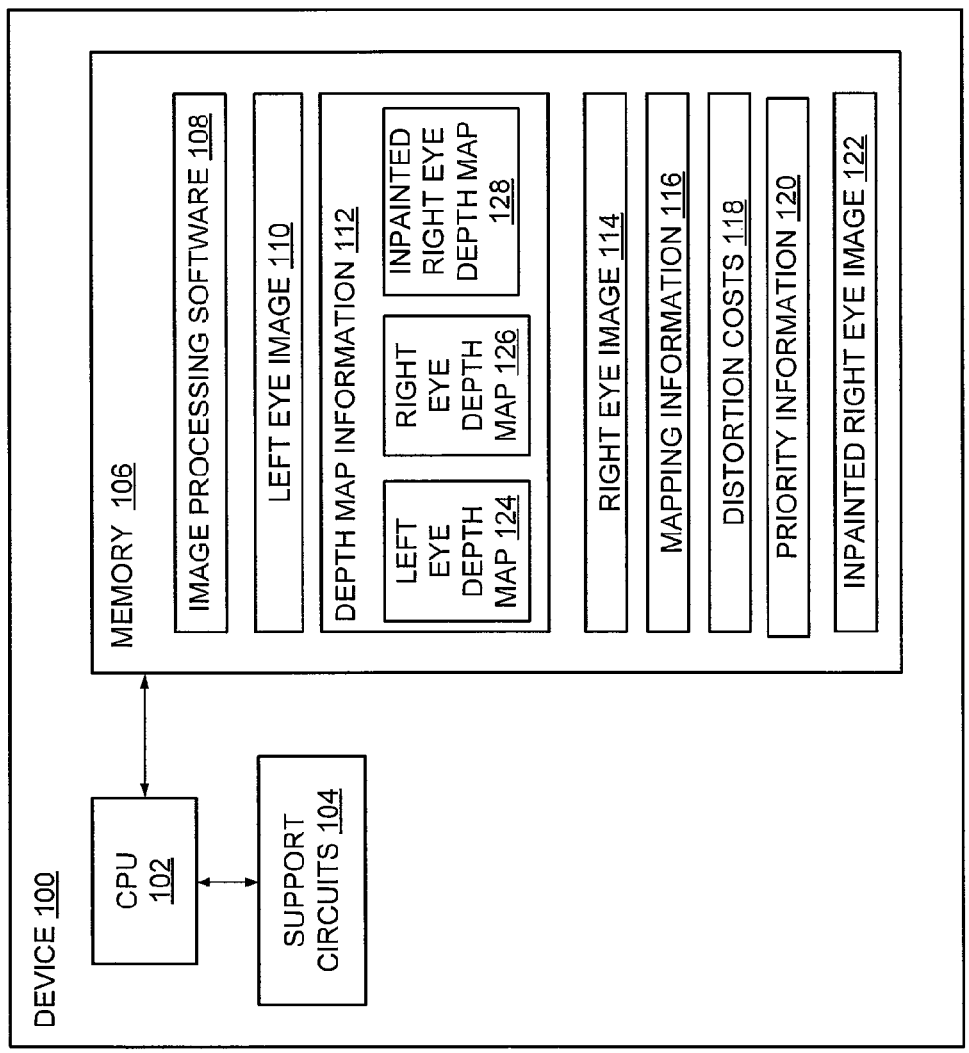
FIG. 1 illustrates a block diagram of a device for converting a two-dimensional image into a three-dimensional image in accordance with at least one embodiment.

FIG. 1 illustrates a block diagram of a device 100 for converting a two-dimensional image into a three-dimensional image in accordance with at least one embodiment. The device 100 is a type of computing device (e.g., a laptop, a camera, a desktop, a server, a mobile device, a multimedia recording device and/or the like) that comprises a Central Processing Unit (CPU) 102, support circuits 104 and a memory 106. The CPU 102 comprises one or more commercially available microprocessors or microcontrollers that facilitate data processing and storage. The support circuits 104 facilitate operation of the CPU 102 and include clock circuits, buses, power supplies, input/output circuits and/or the like. The memory 106 includes a read only memory, random access memory, disk drive storage, optical storage, removable storage, and the like.

The memory 106 further includes various software packages, such as the image processing software 108. The memory 106 further stores various data, such as a left eye image 110, depth map information 112, a right eye image 114, mapping information 116, distortion costs 118, priority information 120, an inpainted right eye image 122. The left eye image 110 and the inpainted right eye image 122 are stereoscopically complimentary and combine to form a three-dimensional image or view of a scene. The depth map information 112 further includes a left eye depth map 124 and a right eye depth map 126.

The image processing software 108 includes software code (processor executable instructions) for converting a two-dimensional image, such as the left eye image, into a three-dimensional image. After performing a backward projection to the left eye image 110, the image processing software 108 computes depth values and/or intensity (i.e., color) values for pixels within the right eye image 114 by interpolating values from corresponding pixels in the left eye image 110. In some embodiments, the values being interpolated are associated with pixels within the left eye image 110 that map to projected locations (e.g., floating point locations) within the right eye image 114, as indicated in the mapping information 116.

After intensity and depth interpolation, missing or occluded regions within the right eye image 114 and the right eye depth map 126 are inpainted in order to produce the inpainted right eye image 122. In some embodiments, integer locations in the right eye depth map 126 are inpainted using depth values from the left eye depth map 124 that map to a right most pixel in a target region. The image processing software 108 selects a block of pixels to inpaint using the priority information 120. If the priority information 120, for example, assigns a higher priority to right-side blocks, the image processing software 108 inpaints the right eye image 114 from right to left. After selecting the block to inpaint, the image processing software 108 defines a search area for identifying a matching block in a source region of the right eye image 114.

Subsequently, the image processing software 108 uses the inpainted depth values to identify one or more candidate blocks within the search area that substantially match the block to be inpainted. The image processing software 108 computes distortion costs 118 between the one or more candidate blocks and the block to be inpainted. Amongst these candidate blocks, the image processing software 108 selects the candidate block having a miminal distortion with the block to be inpainted. Finally, the image processing software 108 copies various intensity values from the candidate block and stores the intensity values in an unknown or occluded portion of the block to be inpainted (i.e., a portion of a target region of the right eye image 114) to produce the inpainted right eye depth map 128.

Each pixel within the left eye image 110 is associated with an intensity value indicating a color. Each pixel may also be associated with scene information for the left eye image 110. The pixels of the left eye image 110, for example, may depict a two-dimensional representation of a scene where each pixel is associated with one or more intensity values indicating a relative strength of one or more corresponding color components. The left eye depth map 124 indicates depth values reflecting distance and opacity of each pixel. In some embodiments, each pixel includes a five-component representation that can be expressed as an image processing tensor that includes at least a single dimensional image processing matrix (i.e., vector) for at least a two-dimensional image.

An exemplary embodiment of such a matrix is as follows:

$$\begin{bmatrix} x_1 \\ x_2 \\ x_3 \\ \partial_h x \\ \partial_v x \end{bmatrix}$$

This image processing matrix includes primary color components $[x_1, x_2, x_3]$ for the left eye image 110, $\partial_h x$ (i.e., the product of partial derivative along a horizontal direction and a normalization of the primary color components) and $\partial_v x$ (i.e., the product of partial derivative along a vertical direction and a normalization factor of the primary color components). $x_1$, $x_2$ and $x_3$ are intensity values for the primary color components (e.g., red, green, blue (RGB) components), where each intensity value represents an amount or saturation of a particular color in the pixel. For example, if the pixels include a full or strong intensity for each primary color component, the left eye image 110 appears completely white. In addition, an intensity value for a block of pixels may be approximated or computed without examining the intensity values for each pixel.

Figure 2:
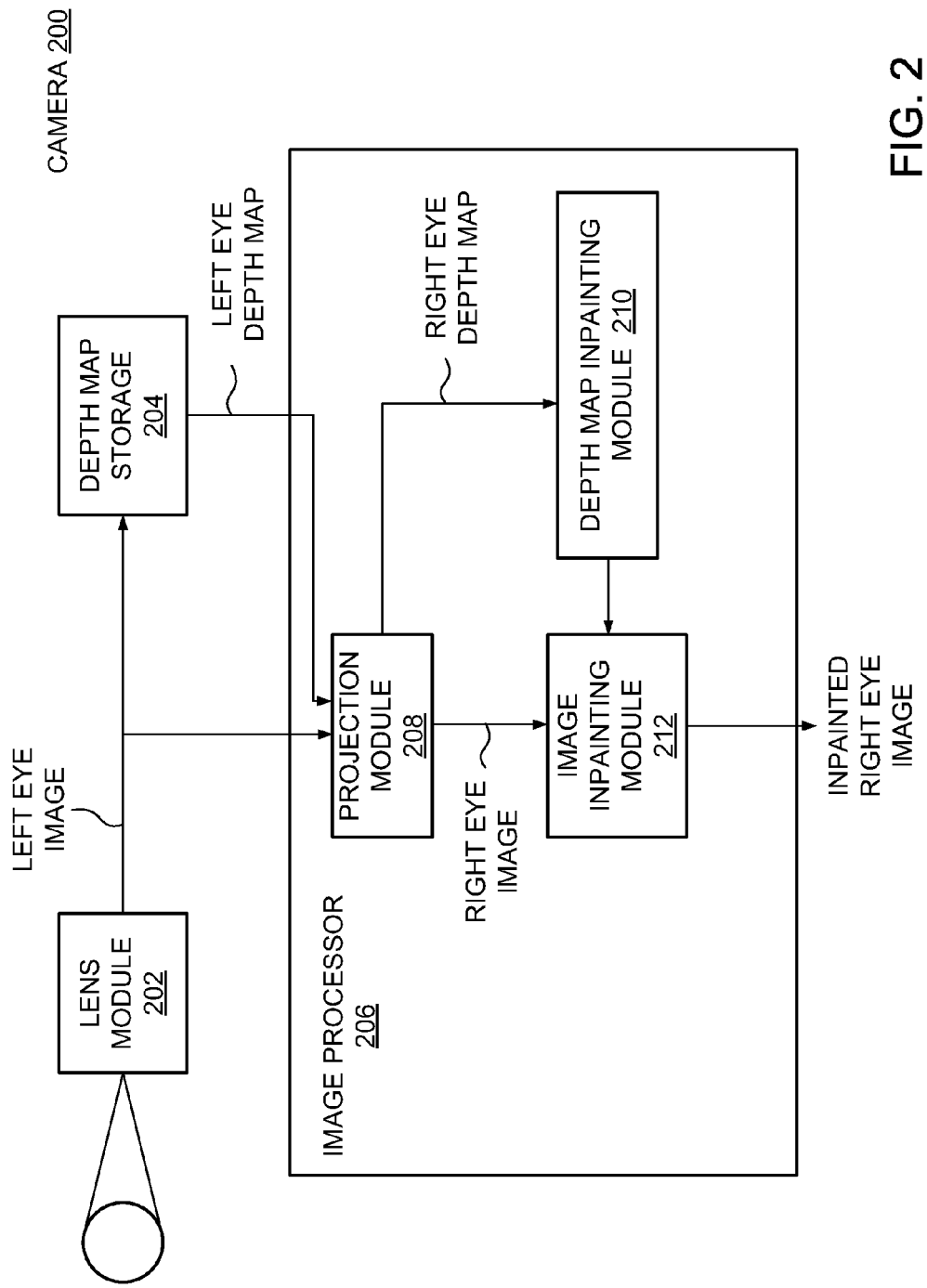
FIG. 2 illustrates a functional block diagram of a device for converting a two-dimensional image into a three-dimensional image in accordance with at least one embodiment.

FIG. 2 is a functional block diagram that illustrates a camera 200 for capturing output images in multiple views, according to one or more embodiments. The camera 200 utilizes a lens module 202, a depth map source 204 and an image processor 206 to produce the output image 122. The lens module 202 is operatively coupled with the depth map source 204 and captures images or video frames. The depth map source 204 stores depth maps associated with the captured images or video frames.

The lens module 202 captures an input and sends the input as a two-dimensional image to the image processor 206. In some embodiments, the lens module 202 captures a beam of light for a left eye and a right eye and produces the two dimensional image. The beam of light is captured from two different viewpoints that are horizontally displaced from each other. In some embodiments, the horizontal displacement between the two viewpoints is approximately 65 mm, an average distance between a person's eyes. In order to produce a three dimensional image, the two dimensional image is assumed to be one of a pair of stereoscopic complimentary images, such as a left eye image (e.g., the left eye image 110 of FIG. 1). Accordingly, the depth map source 204 stores depth values for a left eye depth map.

The image processor 206 is a circuit that receives the left eye depth map and the left eye image and eventually produces an inpainted right eye image as a stereoscopic complement. In some embodiments, the image processor 206 includes hardware components for executing image processing software (e.g., the image processing software 108 of FIG. 1). In some embodiments, the image processor 206 includes various modules, such as a projection module 208, a depth map inpainting module 210 and an image inpainting module 212.

Figure 3A:
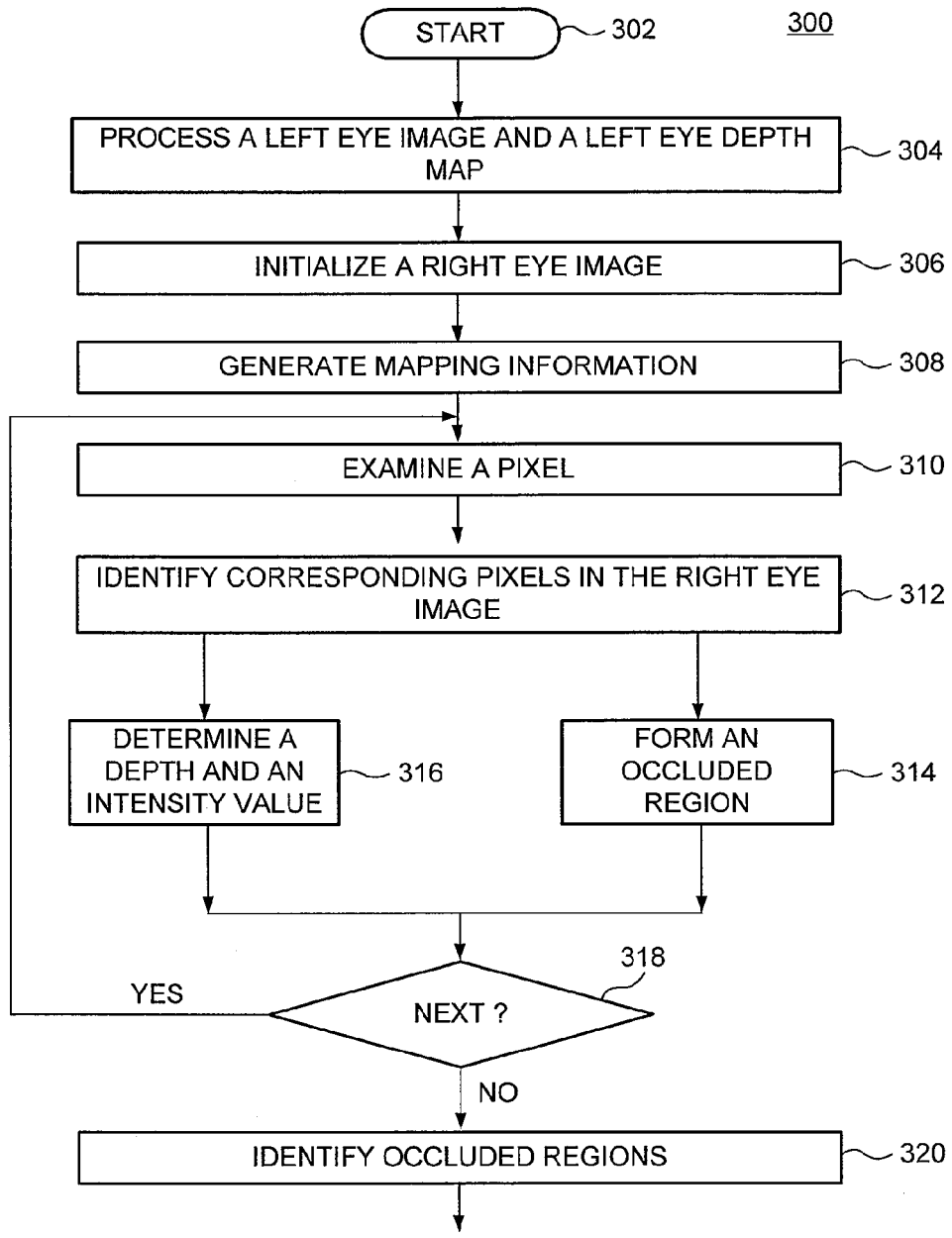
FIGS. 3A and 3B illustrate a flow diagram of a method of converting a two-dimensional image into a three-dimensional image in accordance with at least one embodiment.
Figure 3B:
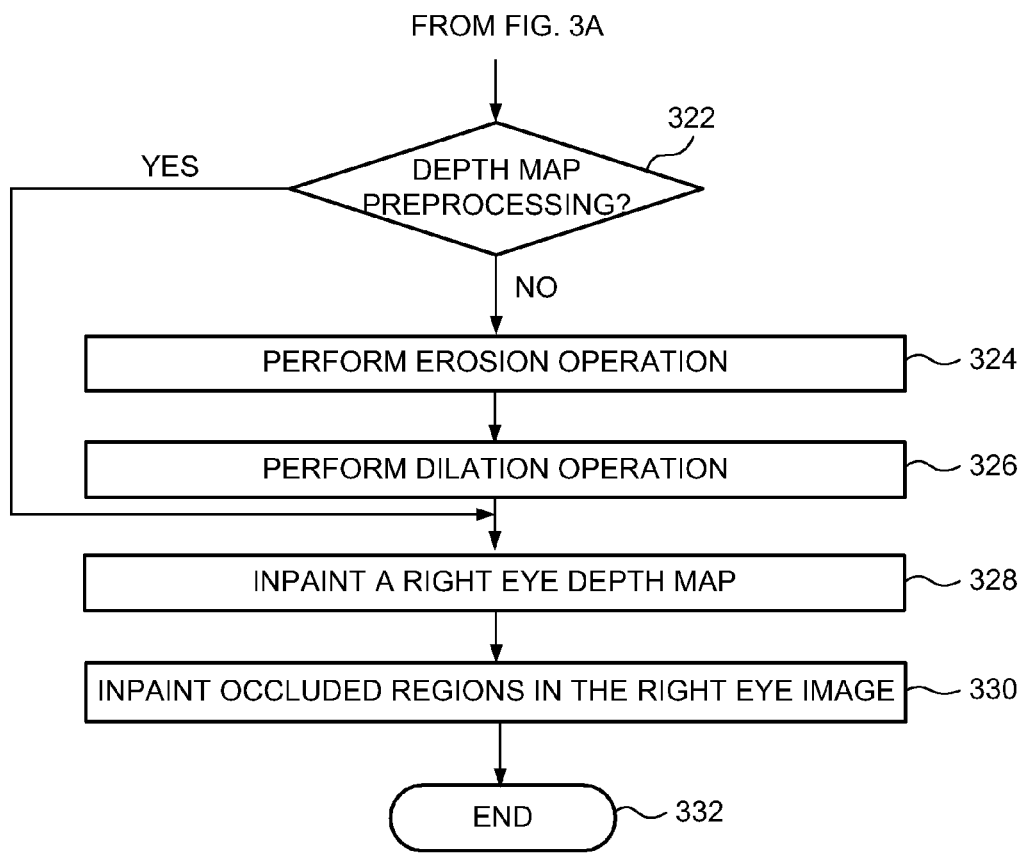

FIGS. 3A and 3B illustrates a flow diagram of a method 300 of converting a two-dimensional image into a three-dimensional image in accordance with at least one embodiment. The method 300 starts at step 302 and proceeds to step 304. At step 304, the method 300 processes a two-dimensional image, such as a left eye image, and depth map information, such as a left eye depth map. At step 306, the method 300 initializes a right eye image, which is a stereoscopic complement to the left eye image.

In combination, the left eye image and the right eye image form a three-dimensional image.

At step 308, the method 300 generates mapping information (e.g., the mapping information 116 of FIG. 1). For an integer pixel location in the left eye image, the mapping information indicates a projected floating point location in the right eye image. In addition, for each integer pixel location in the right eye image, the mapping information indicates a location (e.g., a floating point or integer location) of each corresponding pixel, if any, in the left eye image. In some embodiments, the mapping information includes offsets along an x-axis in the right eye image between an integer pixel location and a floating point location of a corresponding pixel. In some embodiments, the corresponding pixel maps to a projected floating point location within a pre-defined range (e.g., one pixel length) of the particular integer pixel location in the right eye image.

At step 310, the method 300 examines a pixel at an integer location along an horizontal plane of the right eye image. At step 312, the method 300 identifies one or more corresponding pixels in the left eye image for the pixel in the right eye image. If the pixel is occluded, the method 300 proceeds to step 314 at which an occluded region is formed. For example, the occluded pixel may be combined with other adjacent occluded pixels to form the occluded region. Otherwise, the method 300 proceeds to step 316. At step 316, the method 300 determines a depth and intensity values for the pixel in the right eye image.

At step 318, the method 300 determines whether there are more pixels in the right eye image to be interpolated. For example, the method 300 determines if there are additional horizontal lines of pixels. If the determination is a "YES", i.e., if there are more pixels to be interpolated, the method 300 returns to step 310. If the determination is a "NO", i.e., if there are no more pixels that can be interpolated, the method 300 proceeds to step 320. At step 320, the method 300 identifies one or more occluded regions.

At step 322, the method 300 determines whether to perform depth map preprocessing. If the determination is a "NO", i.e., if the depth map is not accurate or prone to cause artifacts during inpainting, the method 300 proceeds to step 324. If, on the other hand, the determination is a "NO", i.e., the depth map preprocessing is not necessary, the method 300 proceeds to step 328. At step 324, the method 300 performs an erosion operation. At step 326, the method 300 performs a dilation operation. At step 328, the method 300 inpaints a depth map for the three-dimensional image, such as a right eye depth map. At step 330, the method 300 inpaints occluded regions within the right eye image. At step 332, the method 300 ends.

Figure 4:
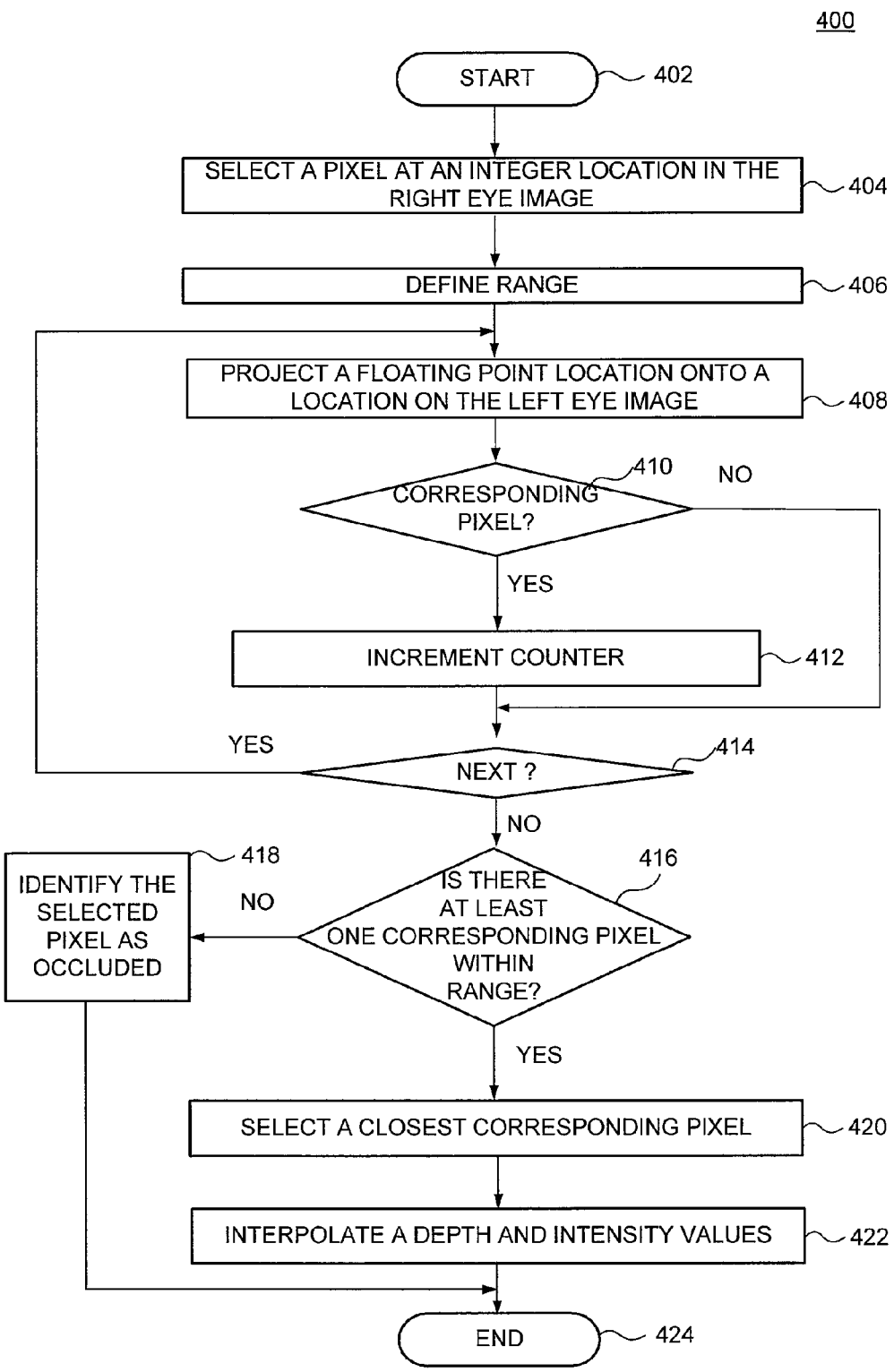
FIG. 4 illustrates a flow diagram of a method of performing backward projection in accordance with at least one embodiment.

FIG. 4 illustrates a flow diagram of a method 400 of performing backward projection in accordance with at least one embodiment. The method 400 starts at step 402 and proceeds to step 404. At step 404, the method 400 selects a pixel at an integer location in the right eye image. At step 406, the method 400 defines a range for searching for corresponding pixels. At step 408, the method 400 projects a floating point location onto a location in the left eye image. At step 410, the method 400 determines if the projected location is a pixel that corresponds with the pixel at the integer location in the right eye image. If the determination is a "YES", i.e., if the method 400 determines that the projected location is at or near an integer location in the left eye image, the method 400 proceeds to step 412 where increment a counter related to a number of corresponding pixels for the selected pixel. If, on the other hand, the determination is a "NO", i.e., the method 400 determines that the projected location is not associated with a integer pixel location in the left eye image, the method 400 proceeds to step 414.

At step 414, the method determines whether is a next floating point location within a pre-defined range, such as one pixel length, of the selected pixel. If the determination is a "YES", i.e., if the method 400 must project another floating point location onto the left eye image, the method 400 returns to step 408. If, on the other hand, the determination is a "NO", i.e., each and every floating point location within the pre-defined range is projected onto the left eye image, the method 400 proceeds to step 416.

At step 416, the method 400 determines whether the selected pixel has at least one corresponding pixel. If no single pixel in the left eye image maps to a right eye image location (e.g., a floating point or integer location) within a pixel length of the selected pixel, the method 400 proceeds to step 418. At step 418, the method 400 identifies the selected pixel as occluded. If, on the other hand, the method 400 determines that there are one or more corresponding pixels in the left eye image for the selected pixel in the right eye image, the method 400 proceeds to step 420. At step 420, the method 400 selects a closest corresponding pixel to the selected pixel for color. At step 422, the method 400 interpolates a depth value and at least one intensity value. At step 424, the method 400 ends.

Figure 5:
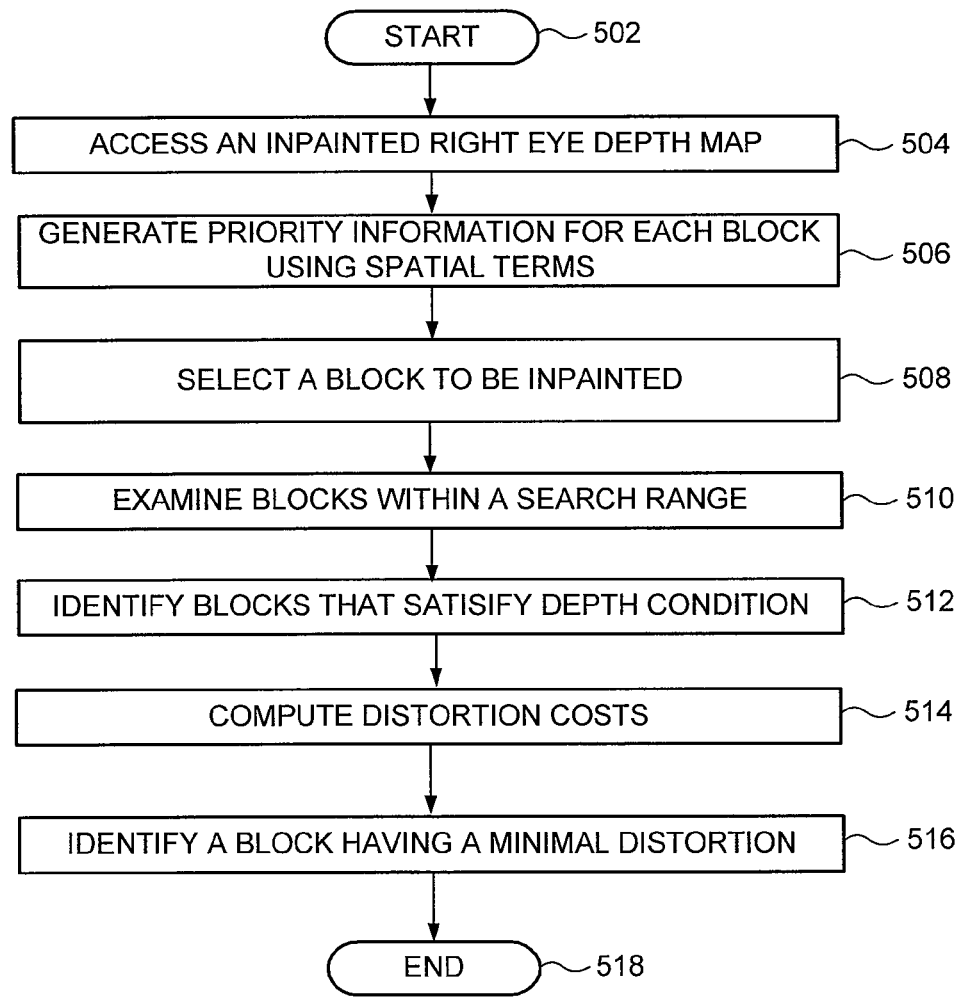
FIG. 5 illustrates a flow diagram of a method of inpainting a right eye image in accordance with at least one embodiment.

FIG. 5 illustrates a flow diagram of a method 500 of inpainting a right eye image in accordance with at least one embodiment. The method 500 starts at step 502 and proceeds to step 504. At step 504, the method 500 accesses an inpainted right eye depth map. After performing a backward projection from a right eye image to a left eye image, image processing software (e.g., the image processing software 108 of FIG. 1) identifies one or more occluded regions within the right eye image and a right eye depth map (e.g., the right eye depth map 126 of FIG. 1) based on mapping information (e.g., the mapping information 116 of FIG. 1). In some embodiments, an occluded region includes one or more pixels for which depth and intensity values could not be interpolated using the left eye image. Then, the image processing software inpaints the one or more occluded regions within the right eye depth map to produce the inpainted right eye depth map (e.g., the inpainted right eye depth map 128 of FIG. 1).

At step 506, the method 500 generates priority information for each block using spatial terms. Generally, the priority information (e.g., the priority information 120 of FIG. 1) is a two-dimensional matrix representation of the assignment of priority values to blocks of pixels within the right eye image. In some embodiments, a priority value (P(x,y)) for a block having a center pixel at location (x,y) is computed using the following equations:

$$P(x, y) = C(x, y)D(x, y) + S(x, y)$$

$$C(x, y) = \frac{1}{|\Psi|} \sum_{p \in \Psi(x,y)} C(p)$$

$$D(x, y) = |\nabla^{\perp} I(x, y) \cdot n(x, y)|$$

$$S(x, y) = x$$

In this equation, priority map P(x,y) is computed using a confidence term C(x,y), a data term D(x,y) and a spatial term S(x,y). A priority P(x,y) is computed for each block that is located at a boundary between a source region and a target region. The data term D(x,y) is a function of a strength of isophotes interacting with a front contour of the target region at each iteration. An isophote, generally, refers to a contour of equal luminence, such as a line or a curve joining points with a same surface brightness in an image. The use of isophotes encourages the inpainting of linear structures within the image.

The confidence term C(x,y) is a summation of a confidence value at each pixel divided by an average depth in the block, which is denoted as the term $\psi$. Hence, $\psi(x,y)$ refers an average depth of a block of pixels, such as a boundary block, having a center pixel located at (x,y) and a portion of the source region. Each confidence value represents a measure of an amount of reliable information surrounding a pixel p within the boundary block. A block or patch having a higher confidence term is inpainted before a block having a lower confidence term due to the fact that more pixels within the block with the higher confidence term are already filled prior to inpainting. Some of these pixels were either previous inpainted or were never a part of the target region.

Additionally, the term n(x,y) produces a normal vector from the contour of the boundary block with the center pixel (x,y). I(x,y) refers to intensity values associated with the right eye image. At step 508, the method 500 selects a block to be inpainted. The method 500 selects a block whose location has the highest priority. Because of the spatial term S(x,y), the method 500 confers a higher priority to block from a right side of an occluded region (i.e., a target region). Accordingly, the method 500 selects one of the right side blocks to be inpainted before any other block. Hence, given the fact that 0≤C(x,y)D (x,y)≤1 using the spatial term S(x,y)=x during block inpainting selection results in the occluded regions being inpainted from right to left. At a same horizontal location, right-side blocks having a higher confidence metric and a higher data term will be inpainted first.

At step 510, the method 500 examines blocks within a search range of a block to be inpainted. In some embodiments, the method 500 selects a right most block that lies on a boundary between a source region and a target region (i.e., an occluded region). In some embodiments directed to exemplar inpainting, the search range is defined as a matrix [L R T B] where each index refers to a range of pixels toward a certain direction (e.g., left, right, top and bottom) from a center pixel (x,y) of the block selected for inpainting. Since there is high probability that a best match for the selected block towards the right and not the left, if the center pixel at position (x,y) is in the source region, the search range is the matrix [0 $R_s$ $T_s$ $B_s$] where $R_s$, $T_s$ and $B_s$ are fixed values.

However, if the center pixel at position (x,y) is in the target region (e.g., an occluded region), the search range is the matrix [0 $R_t$ $T_t$ $B_t$] where $R_t$=R(x+1,y)+$C_r$, $T_t$=T(x,y−1)+$C_t$ and $B_t$=B(x,y+1)+$C_b$. $C_r$, $C_t$ and $C_b$ are floating point values. In some embodiments, $C_r$ is equal to 1.0 and $C_t$ and $C_b$ are equal to 0.1 each. In other words, $R_t$ is equal to a number of pixels towards a right direction for a pixel at position (x+1, y) incremented by $C_r$ (e.g., 1.0). If the pixel at position (x+1, y) lies in the source region, then the value for $R_t$ at position (x,y) is equal to $R_s$+$C_r$. Similarly, if a pixel at position (x,y+1) is in the source region, the value for $B_t$ at position (x,y) is equal to $B_s$+$C_b$. If a pixel at position (x,y+n) is in the source region, the value for $B_t$ at position (x,y) is equal to $B_s$+($C_b$)n. The search range, therefore, adapts to a position (x,y) of the center pixel such that a fixed number of pixels are searched from a boundary between the source region and the target region portions of the block that is selected for inpainting. In other words, an equal number of pixels in the source region are searched regardless of a position of the selected block.

At step 512, the method 500 identifies blocks that satisfy depth condition. Once the method 500 defines the search range, the method 500 searches candidate blocks within the search range for a matching block. In order to optimize the search process, the method 500 only compares certain candidate blocks that satisfy the depth condition as a threshold defined by the following equation:

$$d_{\psi_s} > C_d * d_\Omega$$

In this equation, $d_{\psi_s}$ denotes a depth value of any pixel in a particular candidate block, such as a right-side block of the source region, and $d_\Omega$ refers to a mean depth value of the target region within the block being inpainted. In some embodiments, $C_d$ is set to the floating point value of 0.8. The value of 0.8 is used to illustrate the searching process and is not intended to limit the depth condition, which may use any floating point value as a weight for comparing depth values as long as the floating point value complies with the condition 0<$C_d$<=1.0.

In some embodiments, the inpainted right eye depth map provides the depth values for the target region, which are averaged to produce the mean depth value. According to some embodiments (not shown in FIG. 5), after computing the mean depth value, the method 500 compares the mean depth value to a depth value of each and every pixel in the particular candidate block. If at least one of the pixels satisfies the depth condition, then the method 500 computes a distortion cost between the particular candidate block and the selected block to be inpainted. If none of the pixels satisfy the depth condition, the method 500 proceeds to another candidate block within the defined search range.

At step 514, the method 500 computes distortion costs for the identified blocks. In some embodiments, a distortion cost ($E_t$) refers to a measure of dissimilarity between blocks of pixels. The method 500 determines the distortion cost using the following equations:

$$E_t = e_1 + e_2 \cdot w_d$$

Specifically, $e_1$ and $e_2$ are computed as mean-squared errors of the intensity values and the depth values, respectively. As shown in the equation below, for every complimentary pixel location (x,y) between a source region of a block selected for inpainting and a candidate block, $e_1$ is computed as a mean square error between pixel values:

$$e_1 = \sum_{c \in [1,5]} \sum_{x,y} \{I_1(x, y, c) - I_2(x, y, c)\}^2$$

Index c refers to a position in an image processing vector for each pixel. In some embodiments, indices [1,3] refers to primary color components (i.e., red, green and blue intensity values). Furthermore, indices [4,5] refers to $\partial_h x$ (i.e., the product of partial derivative along a horizontal direction and a normalization of the primary color components) and $\partial_v x$ (i.e., the product of partial derivative along a vertical direction and a normalization factor of the primary color components), respectively. As shown in the equation below, for every complimentary pixel location (x,y) in a target region of the block that is selected for inpainting, $e_2$ is computed as a mean square error between depth values:

$$e_2 = \sum_{(x,y)} (d_1(x, y) - d_2(x, y))^2$$

The weight $w_d$ may be any value that identifies a candidate that best matches the block being inpainted. For example, $w_d$ may be equal to fifty (50). At step 516, the method 500 identifies a block having a minimal distortion. The method 500 identifies the candidate block having a lowest distortion cost and therefore, a highest similarity with the block that is selected for inpainting. It is appreciated that numerous inpainting techniques are applicable in the present disclosure. For example, exemplar-based inpainting, primitive inpainting and graph-cut inpainting may be used to compute intensity values for the inpainted right eye image. At step 518, the method 500 ends.

Figure 6:
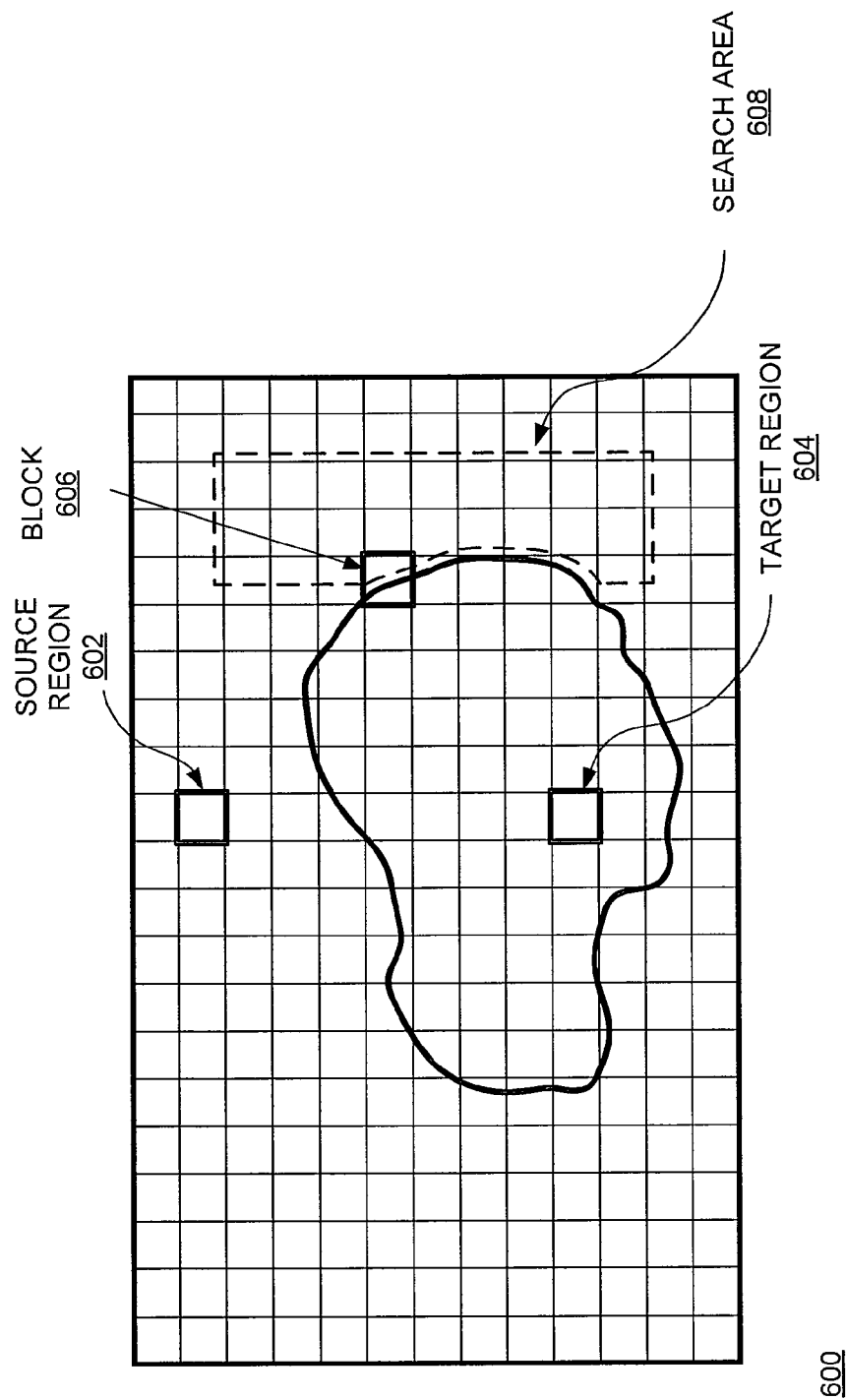
FIG. 6 illustrates a schematic of an right eye image to be inpainted in accordance with at least one embodiment.

FIG. 6 illustrates a schematic depicting an image 600 comprising a source region 602, a target region 604 and a block 606 according to one or more embodiments. The source region 602 includes blocks of pixels that include pixel information. The target region 604 also includes blocks of pixels, but these blocks may include no and/or incorrect pixel information (i.e., the target region 604 is a portion of the image 600 being in-painted using pixel information from the source region 602).

The block 606 may be located on a boundary between the target region 604 and the source region 602 (i.e., a boundary block). As such, each block 606 overlaps a portion of the source region 602 and a portion of the target region 604. The block 606 includes the intensity and depth values provided by the overlapping portions of the source region 602 as well as depth values from an inpainted right eye depth map according to one or more embodiments. The search area 608 includes pixels from the source region 602 that are located to the right of the block 606. Because the search area 608 does not include any unknown pixels, the search area 608 may form an irregularly shaped, closed polygon.

Intensity values associated with the blocks in the source region 602 of the search area 608 are used to determine optimal intensity values for pixels in the portion of the block 606 containing the target region 604. The intensity values of the blocks of the source region are prioritized and/or weighted according to a distance between each center pixel to a center pixel of the block 606. Between two or more neighboring blocks, for example, a lower priority (i.e., weight) is assigned to the neighboring block that is further way from the block 606. A higher priority, however, is assigned to the neighboring block that is on a right side of the block 606. In some embodiments, the search area 608 is defined as a dynamic range of eleven pixels from a center pixel of the block 606 towards a right, a top or a bottom direction. The blocks within the search area 608 are used as candidates for image inpainting as described further below.

Figure 7:
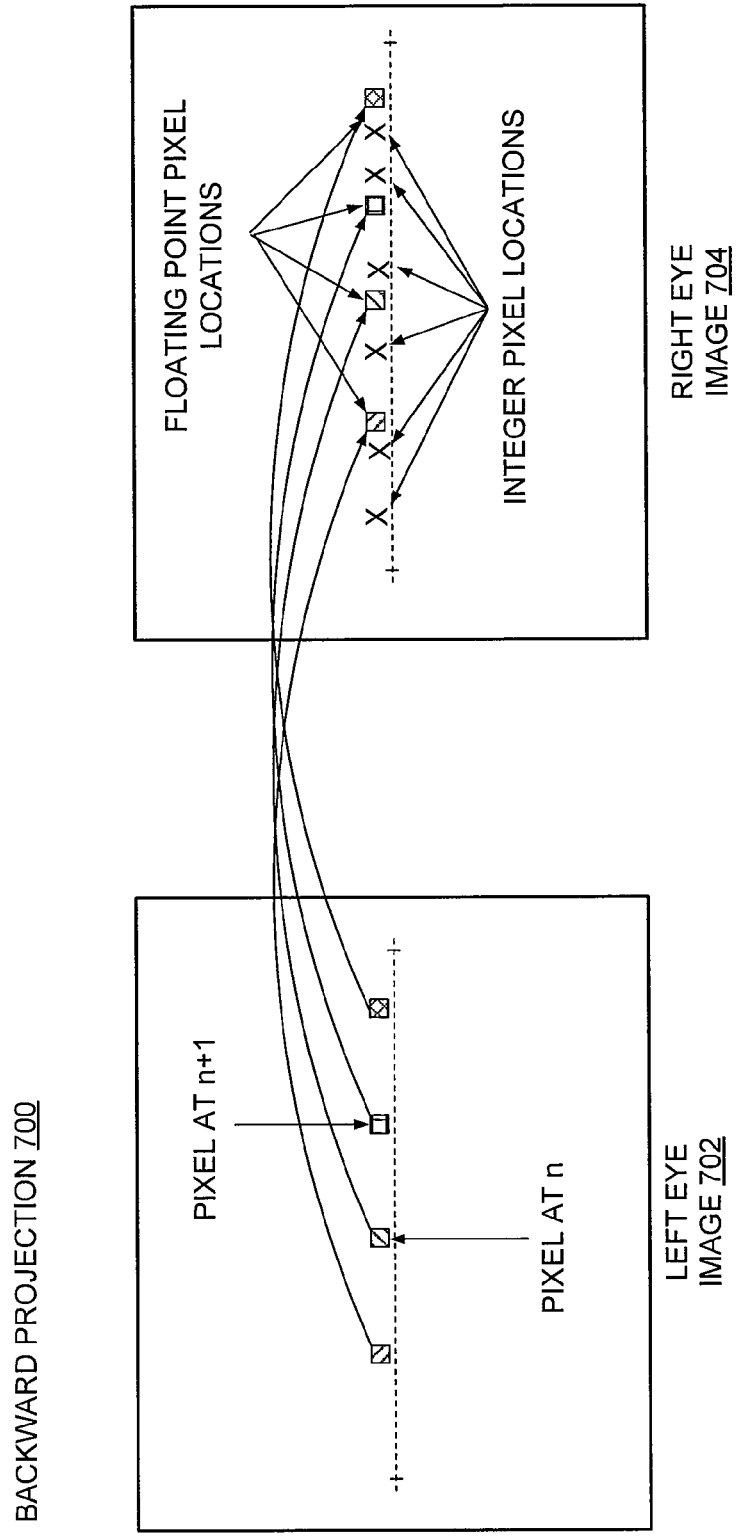
FIG. 7 illustrates backward projection between a right eye image and a left eye image in accordance with at least one embodiment.

FIG. 7 illustrates backward projection 700 between a left eye image 702 and a right eye image 704 in accordance with at least one embodiment. The backward projection 700 describes a process during which depth and intensity values are interpolated for pixels in the right eye image 704. Each pixel is associated with an integer location (i.e., an index). In some embodiments, the backward projection 700 cannot interpolate depth and intensity values for certain pixels, such as occluded pixels. These occluded pixels combine to form one or more occluded regions.

For a pixel in the right eye image 704, one or more corresponding pixels from the left eye image 702, if any, are identified. In some embodiments, the one or more corresponding pixels include integer pixel locations within the left eye image 702 that map to locations (e.g., floating point or integer) within a pre-defined range of the pixel in the right eye image 704. The pre-defined range, for example, may be one pixel length.

FIG. 8 illustrates depth and intensity interpolation 800 on the right eye image 704 of FIG. 7 in accordance with at least one embodiment. Depth and intensity interpolation 800 is a process by which a corresponding pixel in the left eye image 702 of FIG. 7 is selected and used to determine depth and intensity values for a pixel in the right eye image 704 of FIG. 7. In some embodiments, a closest corresponding pixel is selected for the interpolation.

For example, index 802 is an integer location of the pixel in the right eye image. Corresponding pixel 804 and corresponding pixel 806 map to floating point locations within a range 808 of the pixel. The range 808 may be a pre-defined distance from the pixel, such as one to n pixel lengths. Alternatively, the range 808 may also be a fraction of a pixel length. In FIG. 8, the range 808 defines a space between a preceding pixel 810 for the index 802 and a succeeding pixel 812. Hence, the depth and intensity interpolation 800 is performed using corresponding pixels in the left eye image 702 that map to a location between one pixel length of the pixel at the index 802.

Between the corresponding pixels 804 and 806, the corresponding pixel 806 is closest to the index 802 and therefore, selected to determine a depth and intensity values for the pixel at the index 802. In some embodiments, a depth and intensity values of the corresponding pixel 806 are copied and stored in a right eye depth map and the right eye image 704, respectively. In some embodiments, the intensity values associated with the corresponding pixel 806 are modified to produce a more accurate color.

While, the present invention is described in connection with the preferred embodiments of the various figures. It is to be understood that other similar embodiments may be used. Modifications/additions may be made to the described embodiments for performing the same function of the present invention without deviating therefore. Therefore, the present invention should not be limited to any single embodiment, but rather construed in breadth and scope in accordance with the recitation of the appended claims.

The invention claimed is:

1. A computer implemented method of converting a two-dimensional image into a stereoscopic three-dimensional image, comprising:
   for each pixel within a right eye image:
      identifying at least one corresponding pixel from a left eye image by backwards projection comprising:
         defining a range for searching the left eye image for the at least one corresponding pixel;
         projecting a floating point location from the right eye image onto a location within the range in the left eye image;
         determining whether the projected location is approximately at an integer location in the left eye image; and
         projecting a pixel from the projected location onto the right eye image;
      forming at least one occluded region if the at least one corresponding pixel is occluded in the right eye image; otherwise,
      determining a depth and an intensity value for the pixel within the right eye image using the at least one corresponding pixel, wherein the depth value is stored in a right eye depth map and the intensity value is stored in the right eye image; and
      inpainting the at least one occluded region within the right eye image using the right eye depth map by generating priority information for each of a plurality of blocks in the right eye image using a product of data terms and confidence terms, the product being summed with spatial terms, wherein each of the data terms is a function of a strength of isophotes interacting with a front contour of a target region in the right eye image, each of the confidence terms represents a measure of an amount of reliable information surrounding a pixel at a boundary block and each of the spatial terms comprise priority values assigned to positions of particular blocks of pixels in the right eye image.

2. The method of claim 1, wherein the at least one corresponding pixel is projected onto at least one location within one pixel length of the pixel within the right eye image.

3. The method of claim 1, wherein determining the depth and the intensity value further comprises selecting a pixel amongst the at least one corresponding pixel, wherein the selected pixel maps to a location that is closest to the pixel in the right eye image.

4. The method of claim 3 further comprising interpolating at least one of: the depth value using a depth value from the selected pixel and the intensity value using an intensity value from the selected pixel.

5. The method of claim 1 further comprising inpainting at least one occluded region within a right eye depth map.

6. The method of claim 5 further comprising performing preprocessing on the right eye depth map by performing a dilation operation and then an erosion operation on the right eye depth map.

7. The method of claim 1 wherein inpainting the at least one occluded region within the right eye image further comprising:
   selecting a block of the image that satisfies a depth condition, which indicates that a depth value of a pixel in the block is greater than a product of the mean depth value of the block and weight that is greater than zero and less than 1.0, to be inpainted based on the right eye depth map, wherein the selected block comprises a portion of the at least one occluded region; and
   identifying a block having a minimal distortion with the selected block.

8. The method of claim 7 further comprising copying intensity values associated with pixels from the identified block to the selected block.

9. The method of claim 7, wherein identifying the block further comprises examining distortion costs between right-side blocks and the selected block.

10. The method of claim 9 further comprising computing the distortion costs using depth values from at least one target region.

11. The method of claim 9, wherein the right-side blocks are located within a number of pixels of a boundary between a source region and a target region.

12. An apparatus for multiview generation of an image using depth map information, comprising:
   a lens module for capturing a left eye image;
   depth map storage comprising a left eye depth map; and
   an image processor configured for:
      identifying at least one corresponding pixel from the left eye image for each pixel within a right eye image by backwards projection comprising:
         defining a range for searching the left eye image for the at least one corresponding pixel;
         projecting a floating point location from the right eye image onto a location within the range in the left eye image;
         determining whether the projected location is approximately at an integer location in the left eye image; and
         projecting a pixel from the projected location onto the right eye image,
      forming at least one occluded region if the at least one corresponding pixel is occluded in the right eye image; otherwise,
      determining a depth and an intensity value for the pixel within the right eye image using the at least one corresponding pixel, wherein the depth value is stored in a right eye depth map and the intensity value is stored in the right eye image; and
      inpainting at least one occluded region within the right eye image using the right eye depth map by generating priority information for each of a plurality of blocks in the right eye image using a product of data terms and confidence terms, the product being summed with spatial terms and at least one source region located to a right of the at least one occluded region, wherein each of the data terms is a function of a strength of isophotes interacting with a front contour of a target region in the right eye image, each of the confidence terms represents a measure of an amount of reliable information surrounding a pixel at a boundary block and each of the spatial terms comprise priority values assigned to positions of particular blocks of pixels in the right eye image.

13. The apparatus of claim 12, wherein the image processor projects the at least one corresponding pixel onto at least one location within one pixel length of the pixel within the right eye image.

14. The apparatus of claim 12, wherein the image processor selects a pixel amongst the at least one corresponding pixel, wherein the selected pixel is projected to a location that is closest to the pixel in the right eye image.

15. The apparatus of claim 12 wherein the image processor further comprises an inpainting module for selecting a block of the image to be inpainted based on the right eye depth map, wherein the selected block comprises a portion of the at least one occluded region and identifying a block having a minimal distortion with the selected block.

16. A non-transitory computer readable storage medium comprising one or more processor executable instructions that, when executed by at least one processor, causes the at least one processor to perform a method comprising:
   for each pixel within a right eye image:
      identifying at least one corresponding pixel from a left eye image by backwards projection comprising:
         defining a range for searching the left eye image for the at least one corresponding pixel;
         projecting a floating point location from the right eye image onto a location within the range in the left eye image;
         determining whether the projected location is approximately at an integer location in the left eye image; and
      projecting a pixel from the projected location onto the right eye image;
      forming at least one occluded region if the at least one corresponding pixel identified by backwards projection is occluded in the right eye image; otherwise,
      interpolating a depth and an intensity value for the pixel within the right eye image using the at least one corresponding pixel, wherein the depth value is stored in a right eye depth map and the intensity value is stored in the right eye image; and
   inpainting at least one occluded region within the right eye image using the right eye depth map by generating priority information for each of a plurality of blocks in the right eye image using a product of data terms and confidence terms, the product being summed with spatial terms and at least one source region located to a right of the at least one occluded region, wherein each of the data terms is a function of a strength of isophotes interacting with a front contour of a target region in the right eye image, each of the confidence terms represents a measure of an amount of reliable information surrounding a pixel at a boundary block and each of the spatial terms comprise priority values assigned to positions of particular blocks of pixels in the right eye image.

17. The computer-readable-storage medium of claim 16, wherein the one or more processor executable instructions perform the method further comprising:
   projecting the at least one corresponding pixel onto at least one location within one pixel length of each pixel within the right eye image.

18. The computer-readable-storage medium of claim 16, wherein the one or more processor executable instructions perform the method further comprising:

selecting a pixel amongst the at least one corresponding pixel, wherein the selected pixel is projected to a location that is closest to the pixel in the right eye image.

19. The computer-readable-storage medium of claim 16, wherein the one or more processor executable instructions perform the method further comprising:

selecting a block of the image to be inpainted based on the right eye depth map, wherein the selected block comprises a portion of the at least one occluded region;

examining distortion costs between the selected block and right-side blocks within a number of pixels of a boundary between a source region and a target region; and identifying a right-side block having a minimal distortion with the selected block.

20. The computer-readable-storage medium of claim 19, wherein the one or more processor executable instructions perform the method further comprising:

computing the distortion costs using depth values from at least one target region.

* * * * *